(12) United States Patent
Crain et al.

(10) Patent No.: US 9,441,108 B2
(45) Date of Patent: Sep. 13, 2016

(54) THERMOSET POLYURETHANE FOAM CONTAINING BROMINATED POLYMERIC FLAME RETARDANT

(71) Applicant: Dow Global Technologies LLC, Midland, MI (US)

(72) Inventors: Steven P. Crain, Midland, MI (US); William G. Stobby, Ann Arbor, MI (US); Ted A. Morgan, Midland, MI (US); Daniel T. Youmans, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/359,530

(22) PCT Filed: Dec. 11, 2012

(86) PCT No.: PCT/US2012/068897
§ 371 (c)(1),
(2) Date: May 20, 2014

(87) PCT Pub. No.: WO2013/095992
PCT Pub. Date: Jun. 27, 2013

(65) Prior Publication Data
US 2014/0343180 A1    Nov. 20, 2014

(51) Int. Cl.
| | |
|---|---|
| *C08L 75/04* | (2006.01) |
| *C08L 53/02* | (2006.01) |
| *C08J 9/00* | (2006.01) |
| *C08J 9/14* | (2006.01) |
| *C08L 9/06* | (2006.01) |

(52) U.S. Cl.
CPC .............. *C08L 75/04* (2013.01); *C08J 9/0019* (2013.01); *C08J 9/0061* (2013.01); *C08J 9/141* (2013.01); *C08J 9/143* (2013.01); *C08L 9/06* (2013.01); *C08L 53/025* (2013.01); *C08J 2375/04* (2013.01); *C08J 2409/06* (2013.01); *C08J 2453/02* (2013.01); *C08L 2201/02* (2013.01); *C08L 2203/14* (2013.01)

(58) Field of Classification Search
CPC ........................ C08J 2453/02; C08J 2409/06
See application file for complete search history.

(56) References Cited

U.S. PATENT DOCUMENTS

| | | | |
|---|---|---|---|
| 4,407,981 A * | 10/1983 | Aaronson | 521/107 |
| 7,851,558 B2 | 12/2010 | King et al. | |
| 2008/0287559 A1* | 11/2008 | King et al. | 521/56 |
| 2011/0086217 A1* | 4/2011 | Crain et al. | 428/305.5 |

FOREIGN PATENT DOCUMENTS

| | | |
|---|---|---|
| CN | 101305022 | 6/2012 |
| WO | 0112707 | 2/2001 |
| WO | WO 0112707 A1 * | 2/2001 |
| WO | WO 2008021417 A2 * | 2/2008 |

OTHER PUBLICATIONS

PHT4-DIOL Information. Great Lakes Solutions. Oct. 21, 2010.*
Rubinate 1850 MDI Technical Data Sheet. Huntsman Corporation. 2010.*
Randall, D.; Lee, S. The Polyurethanes Book. Huntsman International LLC, Polyurethanes business. 2002. pp. 214-217.*
Levchik, S.; Luda, M. P.; Bracco, P.; Nada, P.; Costa, L. Discoloration in Fire-Retardant Flexible Polyurethane Foams. Journal of Cellular Plastics, vol. 41, 2005, pp. 235-250.*
Zhao, Y.; Gordon, M. J.; Takeei, A.; Hsieh, F.; Suppes, G. J. Modeling Reaction Kinetics of Rigid Polyurethane Foaming Process. Journal of Applied Polymer Science, 2013, pp. 1131-1138.*
Larsen, E. R.; Ecker, E. L. Thermal stability of fire retardants: V. Decomposition of haloalkyl phosphates under polyurethane processing conditions. Journal of Fire Sciences, vol. 6, 1988, pp. 363-379.*

* cited by examiner

*Primary Examiner* — Robert C Boyle
*Assistant Examiner* — Stephen Rieth
(74) *Attorney, Agent, or Firm* — Steven W. Mork

(57) ABSTRACT

Prepare a thermoset polyurethane foam containing a brominated polymer with aliphatic bromine as a flame retardant.

13 Claims, No Drawings

THERMOSET POLYURETHANE FOAM CONTAINING BROMINATED POLYMERIC FLAME RETARDANT

BACKGROUND OF THE INVENTION

1. Field of the Invention

The present invention relates to thermoset polyurethane foam containing a brominated polymeric flame retardant, an isocyanate composition useful for making such foam and a method for making such foam.

2. Introduction

Thermoset polyurethane (PU) foam is a target for continuously changing and ever increasingly demands with respect to flame retardant and reduced smoke generation characteristics. Thermoset PU foam is commonly used in applications requiring the foam to meet specific flame retardant performance standards. Such applications include thermal insulation in building and construction. To achieve necessary flame retardant performance properties, thermoset PU foams often include brominated flame retardants. Flame retardants that are suitable for thermoset PU foam tend to be different from those that are suitable for thermoplastic polymer foam such as extruded polystyrene (XPS) and expanded polystyrene (EPS) foam. XPS and EPS foams soften and flow quickly away from the heat of a flame so flame retardants are designed to prevent ignition of a flame at the foam surface long enough for to the foam to move away from the flames. Unlike XPS and EPS foam, thermoset PU foam does not soften and flow from the heat of a fire because it is a heat stable thermoset.

Moreover, brominated flame retardant in XPS and EPS must be stable to release of bromine from the flame retardant molecule during processing temperature of at least 200 degrees Celsius (° C.) for extended periods of time. Such a stable flame retardant is not necessary, or even clearly desirable in thermoset PU foam. Thermoset PU foams generally do not exceed exothermic temperatures of 150° C. during manufacture, and if they do exceed 150° C. it is only for relatively short periods of time to avoid scorching the foam's interior. The higher stability of brominated flame retardants required for XPS and EPS is not necessary to survive the foaming process for making thermoset PU foam. Therefore, brominated flame retardants suitable for XPS and EPS foam are not necessarily suitable in thermoset PU foam.

Brominated flame retardants most commonly used in thermoset PU foam include aryl-brominated polyester polyols and aliphatic brominated small molecules such as dibromoneopentyl glycol, tribromoneopentyl alcohol and n-propyl bromide (n-PBr). Small molecule flame retardants, in general, have become undesirable because they have a higher tendency to migrate out from a material and enter the environment than larger molecules. In particular, n-PBr has a relatively high vapor pressure and tends to dissipate from thermoset PU foam over time. As a result, not only does n-PBr tend to migrate into the environment but flame retardant properties of thermoset PU foam containing n-PBr can gradually diminish over time as n-PBr is lost. Migration into the environment is particularly troublesome for small molecule brominated flame retardants, which tend to fall under regulatory scrutiny for being persistent and bioaccumulative. Therefore, small molecule brominated flame retardants are not desirable. There is a need for large molecule brominated flame retardants that are suitable for use in thermoset PU foam to avoid the problems associated with these small molecule brominated flame retardants.

Brominated polyols are somewhat larger molecules than n-PBr and are available for use in preparing thermoset PU foam as an alternative to n-PBr. Brominated polyols are reactive with isocyanate materials and as a result tend to consume isocyanate reactive sites and become bound into the backbone of PU polymer during polymerization. Brominated polyols are typically significantly more rigid than the non-brominated polyols and so reacting brominated polyols into thermoset PU foam tends to diminish resulting foam properties by, for example, increasing friability and dust formation associated with the thermoset PU foam. Another challenge with brominated polyols is their tendency to regenerate and migrate into the environment as the foam containing the brominated polyols undergoes environmentally induced decomposition through oxidation and/or hydrolysis. Therefore, it is desirable to find a non-reactive brominated flame retardant that has sufficient size so that it is unlikely to migrate from thermoset PU foam.

Published United States patent application US2011/0224320 and US2011/0224363 disclose brominated branched and star-branched styrene polymers that are taught as possible flame retardants in PU foam. The reference teaches dissolving the brominated polymer into a liquid phosphate flame retardant as a means for introducing both flame retardants into a PU foam formulation prior to reacting and foaming the formulation.

U.S. Pat. No. 7,585,443B2 discloses the use of brominated anionic styrenic polymer for use as a flame retardant for a variety of plastics including PU, though there is no mention of thermoset PU foam.

The brominated polymer flame retardants of US2011/0224320, US2011/0224363 and U.S. Pat. No. 7,585,443B2 contain bromine bound to aromatic rings. Bromine bound to aromatic rings (aromatic bromine) is particularly stable to bromine loss. As a result, the brominated polymer flame retardants of these references are require high temperatures or the use of small molecule synergists (such as polycumyl and/or antimony oxide) to release hydrogen bromide at the necessary temperature to inhibit combustion in thermoset PU foam. It is desirable to find an alternative brominated flame retardant that does not react with (consume) isocyanate sites, that has a lower stability than brominated aromatics, that does not require the presence of small molecule synergists and that are polymeric so as to have sufficient size to avoid migration into the environment.

BRIEF SUMMARY OF THE INVENTION

The present invention provides a solution to the problem of preparing polyurethane (PU) foam with a brominated flame retardant that does not react with isocyanate sites and that avoids the migratory concerns with small molecule brominated flame retardants such as n-PBr, reactivity and migratory concerns associated with brominated polyols and high stability challenges associated with brominated aromatic materials.

The present invention utilizes a brominated polymer with aliphatic-bound bromine. That is, the brominated polymer contains aliphatic portions with bromine bound to the aliphatic portions. One of the surprises in discovering the present invention was that the brominated polymer with aliphatic-bound bromine acts as an effective flame retardant in PU foam. A similar brominated polymer has recently been reported to be suitable for use in polymeric foam, but limited to only vinyl aromatic polymer foam such as extruded polystyrene (XPS) and expanded polystyrene (EPS) foam (see, for example, EP1957544 at paragraph 12). PU foam, which is free from vinyl aromatic polymer, has a different burning characteristic than XPS and EPS foam. Thermoset PU foam has yet further different burning characteristics than XPS and EPS (both of which are thermoplastics) due to the thermoset character of the PU foam which causes the polymer in the foam to remain in a flame source as opposed to melt an drip or draw away as in a thermoplastic foam. One of the challenges overcome with an embodiment of the present invention is in incorporating solid brominated polymer into the PU foam. That challenge was overcome by dispersing the solid brominated polymer into an isocyanate-containing composition prior to forming the foam. Forming a suitable dispersion also required discovering a suitable surface active agent that enables forming a dispersion with enough stability to allow formation of PU foam with the brominated polymer well dispersed therein In a first aspect, the present invention is a thermoset polyurethane foam comprising a brominated polymer, wherein the brominated polymer has copolymerized therein a butadiene moiety and a vinyl aromatic monomer moiety, the copolymer having, prior to bromination, a vinyl aromatic monomer content of from 5 to 90 percent by weight based upon copolymer weight, a 1,2-butadiene isomer content of greater than zero percent by weight based upon butadiene moiety weight, and a weight average molecular weight of at least 1000, the brominated copolymer having an unbrominated, non-aromatic double bond content of less than or equal to 50 percent based on non-aromatic double bond content of the polymer prior to bromination as determined by proton nuclear magnetic resonance spectroscopy and a five percent weight loss temperature, as determined by dynamic thermogravimetric analysis of at least 170 degrees Celsius.

In a second aspect, the present invention is an isocyanate composition used to prepare the thermoset polyurethane foam of the first aspect, the isocyanate composition comprising an isocyanate-containing compound, an interfacial agent and a brominated polymer wherein: (a) the isocyanate-containing compound contains at least two isocyanate functionalities per molecule; (b) the interfacial agent: (i) has a hydrophilic-lipophilic balance in a range of 5 to 15 as determined by the Rosen method or a cloud point temperature of up to 60 degrees Celsius in a 4 weight-percent aqueous solution as determined by DIN EN 1890; (ii) has a viscosity of at least 500 centiPoise at 25 degrees Celsius as determined using a Brookfield viscometer and spindle 63 at 50 revolutions per minute; and (iii) is present at a concentration of at least ten weight-percent and 50 weight-percent or less relative to the total combined weight of brominated polymer and interfacial agent; and (c) the brominated polymer is dispersed as solid particles in the isocyanate-containing compound and the brominated polymer has copolymerized therein a butadiene moiety and a vinyl aromatic monomer moiety, the copolymer having, prior to bromination, a vinyl aromatic monomer content of from 5 to 90 percent by weight based upon copolymer weight, a 1,2-butadiene isomer content of greater than zero percent by weight based upon butadiene moiety weight, and a weight average molecular weight of at least 1000, the brominated copolymer having an unbrominated, non-aromatic double bond content of less than or equal to 50 percent based upon non-aromatic double bond content of the copolymer prior to bromination as determined by proton nuclear magnetic resonance spectroscopy and a five percent weight loss temperature, as determined by dynamic thermogravimetric analysis of at least 170 degrees Celsius.

In a third aspect, the present invention is a method for preparing the polymeric foam of the first aspect by: (a) providing the isocyanate-containing composition of the second aspect; (b) providing a polyol-containing composition containing a polyol and a blowing agent; (c) mixing the isocyanate-containing composition with the polyol-containing composition and allowing to react and form the foam of first aspect; wherein at least one of the isocyanate-containing compound and polyol have an average of more than two isocyanate-reactive sites per molecule and wherein the method further comprises either including a reaction catalyst in the polyol-containing composition or mixing a reaction catalyst together with the isocyanate-containing composition and polyol-containing composition during step (c).

Foams of the present invention are useful for thermal insulation and any other application suitable for thermoset PU foam. The isocyanate-containing composition and method of the present invention are useful for preparing the foam of the present invention.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

"Polyurethane foam" is a polymeric foam whose polymer network comprises polyurethane.

"Polyurethane" is a polymer comprising carbamate linkages. The polymer can further comprise other linkages, particularly other isocyanate linkages "Linkage" refers to a bond formed between molecules during polymerization.

"Thermoset polyurethane foam" is a polyurethane foam that is unable to reversibly go from a solid to flowable state upon change in temperature without degradation of the foam's polymer network. A thermoset polyurethane foam typically contains a crosslinking network of isocyanate linkages among the foam's polymer network. A common thermoset polyurethane foam contains "trimer" linkages, which are a series of three linkages between isocyanate moieties that form a ring. A thermoset polyurethane foam comprising trimer linkages can be characterized by a "percent trimer" or "% Trimer", which is the weight-percent of trimer moieties to total polymer weight. % Trimer is calculated for a thermoset polyurethane foam from its starting materials by dividing the difference between the number of isocyanate equivalents an isocyanate reactive equivalents in the starting materials by the sum of the masses for the isocyanate starting materials and mass of isocyanate reactive starting materials, then multiplying that ratio by (126/3) and then multiplying that by 100.

"Isocyanate linkage" is a bond formed by the reaction of an isocyanate and an isocyanate reactive site. functional group that is reactive with an isocyanate (for example, a hydroxyl group).

"Isocyanate reactive site" is a moiety that is reactive with an isocyanate. Isocyanate reactive sites include other isocyanate groups as well as hydroxyl (—OH) groups of alcohols and water.

"Isocyanate" is a functional group of elements nitrogen (N), carbon (C) and oxygen (O) having double bonds between the nitrogen and carbon and between the carbon and oxygen and further bound to a molecule (R) through a single bond to the nitrogen: R—N=C=O.

"Unsubstituted" and "non-substituted" are interchangeable herein and refer to a molecule that lacks substitution, or the particular substation referred to in the context of the term's usage.

The thermoset polyurethane foam of the present invention comprises a continuous PU polymer network that defines multiple cells therein. The polymer comprises branched isocyanate linkages and averages more than two such isocyanate linkages per polymer molecule. By having more than two such isocyanate linkages per molecule the polymer network contains crosslinking and is a thermoset material. As such, the polymer network tends to resist melting when exposed to a flame and instead burns or chars. That characteristic contributes to the challenge in imparting flame retardant properties to thermoset polyurethane foam as compared to thermoplastic foam such as XPS and EPS which would tend to melt away from a flame.

The PU polymer network is a reaction product of the isocyanate-containing compound of the present invention and a polyol-containing composition as described below. As such, the PU polymer network can be characterized by polymeric reaction products of those components. To achieve crosslinking and the more than two isocyanate linkages polymer molecule, the isocyanate-containing compound has on average a functionality of 2 or more, preferably, 2.4 or more, still more preferably 2.7 or more. At the same time, it is desirably for the isocyanate-containing compound to have on average a functionality 3.5 or less and preferably 3.2 or less. "Functionality" refers to the number of isocyanate moieties per molecule. The values "on average" refer to the average functionality of all the isocyanate-containing compounds as opposed to, for example, a requirement that every isocyanate-containing compound fall within the above functionality values. Crosslinking is further facilitated by, and therefore it is desirable to use in producing the thermoset polymer foam to the present invention, a polyol-containing composition that contains more than two hydroxyl functionalities per molecule.

The brominated polymer used in the present invention has particular characteristics that have been discovered as particularly suitable for imparting flame retardant properties to thermoset PU foam. The brominated polymer has copolymerized therein a butadiene moiety and a vinyl aromatic monomer moiety. "Alkenyl aromatic" and "vinyl aromatic", whether used to describe "monomer" or "polymer", have the same meaning and the generic use of either term includes both substituted and unsubstituted (non-substituted) species. Suitable alkenyl aromatic species include non-aromatic substituted (for example, poly(alpha-methylstyrene)), ring-substituted (for example, halogenated styrenes such as 2- or 4-bromo-styrene), alkoxylated styrenes such as 2- or 4-methoxystyrene, nitrated styrenes (for example, 2-nitrostyrene or 4-nitrostyrene), and alkylated styrenes such as 2- or 4-methylstyrene or 2,4-dimethylstyrene, and unsubstituted species (for example, polystyrene homopolymer), as well as copolymers (for example, styrene/acrylonitrile copolymers, styrene/methylmethacrylate copolymers, and/or styrene/acrylic acid copolymer) or interpolymers (for example, ethylene/styrene interpolymers, or ethylene/propylene/styrene interpolymers).

The brominated polymer has, prior to bromination, a vinyl aromatic monomer content of from 5 to 90 percent by weight based upon polymer weight and a 1,2-butadiene isomer content of greater than zero percent by weight based upon butadiene moiety weight. Furthermore, prior to bromination, the polymer has a weight-averaged molecular weight (Mw) of at least 1000. Determine Mw using gel permeation chromatography relative to a polystyrene standard suing an Agilent 1100 series liquid chromatograph equipped with two Polymer Laboratories PLgel 5 micrometer Mixed-C columns connected in series and an Agilent G1362A refractive index detector (or equivalent device), with tetrahydrofuran (THF) flowing at a rate of 1 milliliter per minute (ml/min) and heated to a temperature of 35° C. as the eluent.

Desirably, the brominated polymer contains at least 10 weight-percent (wt %), preferably 20 wt % or more, still more preferably 30 wt % or more, yet more preferably 40 wt % or more, even more preferably 50 wt % or more and most preferably 60 wt % or more or even 70 wt % or more bromine based on total brominated polymer weight. The brominated polymer can be free of chlorine or can contain up to 25 wt % chlorine based on total brominated polymer weight.

Determine the amount of bromine and chlorine in a brominated polymer using an Oxford Lab X1005 X-ray Fluorescence analyzer. A sample of brominated polymer or foam is submitted to x-ray radiation from a radioactive cadmium source. The x-ray radiation stimulates bromine, chlorine or phosphorous contained in the sample and results in x-ray emissions specific to each atomic species. Measuring the intensity of the x-rays emissions allows one to individually quantify each species contained in the sample.

The brominated polymer is brominated to an extent that at least 25% of the butadiene units in the copolymer, preferably at least 50%, more preferably at least 70% and even more preferably at least 80% of the butadiene units in the brominated polymer prior to bromination are brominated. Up to and including 100% of the butadiene units can be brominated. Bromine bound to butadiene qualifies as "aliphatic bromine", which is any bromine bound to a non-aromatic portion of a molecule.

The brominated polymer is further characterized by having an unbrominated non-aromatic double bond content of less than or equal to 50 percent (%), preferably 25% or less and more preferably 15% or less based on non-aromatic double bond content of the polymer prior to bromination as determined by proton nuclear magnetic resonance spectroscopy. That is, over 50%, preferably 75% or more and more preferably 85% or more of the non-aromatic double bonds in the pre-brominated polymer are brominated in the brominated polymer. As such, the brominated polymer comprises aliphatic bromine. In fact, it is desirable that more than 50 wt %, preferably more than 75 wt % and more preferably 90 wt % or more of the bromine in the brominated polymer is aliphatic based on total weight of bromine. 95 wt % or more and even 98 wt % or more of the bromine in the brominated polymer can be aliphatic bromine. Determine the amount of aliphatic bromine and aromatic bromine in a brominated polymer by carbon-13 nuclear magnetic resonance (NMR) spectroscopy by comparing the integrated area of signals due to aliphatic carbon atoms bonded to bromine (chemical shift less than 100 ppm relative to tetramethylsilane (TMS), and aromatic carbon atoms bonded to bromine (chemical shift greater than 100 ppm relative to TMS).

Determine the percent of butadiene units content that are brominated, polymerized styrene monomer content and 1,2-isomer by proton nuclear magnetic resonance (NMR) spectroscopy by comparing integrated areas of signals due to appropriate protons Residual double bond protons are between 4.8 and 6 ppm, styrene aromatic protons are between 6.2-7.6 ppm, and protons for brominated polybutadiene are between 3.0 and 4.8 ppm with ppm relative to tetramethylsilane (TMS).

Regarding thermal stability, the brominated polymer has a five percent weight loss temperature, as determined by dynamic thermogravimetric analysis of at least 170 degrees Celsius (° C.). The five percent weight loss temperature can be 200° C. or higher, even 220° C. or higher, or even 240° C. or higher. While there is no established upper limit on five percent weight loss temperature for the brominated polymer of the present invention it is likely that the five percent weight loss temperature is 500° C. or less. Determine five percent weight loss temperature using the following dynamic thermogravimetric analysis: 10 milligrams of the polymer is analyzed using a TA Instruments model Hi-Res TGA 2950 or equivalent device, with a 60 millimeters per minute (ml/min) flow of gaseous nitrogen and a heating rate of 10° C./minute over a range of from 25° C. to 600° C. The mass lost by the sample is monitored during the heating step and the temperature at which the sample has lost 5% of its initial weight is designated the five percent weight loss temperature (5% WLT).

A desirable brominated polymer is a brominated styrene-butadiene block copolymer. A particularly desirable brominated polymer is a brominated styrene-butadiene-styrene block copolymer. European patent 1957544B1 (incorporated herein by reference in its entirety) describes brominated polymers that are particularly well suited for use as brominated polymer in the present invention.

The amount of brominated polymer in the thermoset PU foam is desirably sufficient to contribute a bromine concentration of one weight-percent (wt %) or more, two wt % or more, yet more preferably 2.5 wt % or more, still more preferably three wt % or more, even more preferably 3.5 wt % or more and typically ten wt % or less and more typically five wt % or less relative to total thermoset PU foam weight. In one particular embodiment, the brominated polymer contains between 60 and 70 wt % bromine relative to brominated polymer weight and is present at a concentration of more than 1.5 wt %, preferably greater than 2.0 wt % and most preferably greater than 2.5 wt % while at the same time 5 wt % or less relative to total thermoset PU foam weight.

The brominated polymer desirably exists within the thermoset polymer foam as solid particles dispersed within and throughout the polyurethane polymer matrix of the foam (as opposed to, for example, being dispersed as a coating on the surface of the polyurethane polymer matrix). The brominated polymer particles preferably have a weight-mean particle size of greater than one micrometer, more preferably ten micrometer or more and still more preferably 25 micrometer or more. At the same time, it is desirable that the brominated polymer particles have a weight-mean particle size that is smaller than 800 micrometer, preferably 600 micrometers or less and more preferably 400 micrometers or less. These particle sizes render the brominated polymer effective at rendering flame retardant properties and further facilitate dispersion throughout the polymer foam.

Determine weight-mean particle size by the following sieve analysis: (1) prepare two stacks of sieves, first cleaning and recording a tare weight for each sieve. The first stack contains sieves with the following mesh values, in order: 8, 10, 18, 25, 35, 40, 50 and a bottom pan. The second stack contains sieves with the following mesh values, in order: 60, 80, 100, 120, 200, 270, 400, 500 and a bottom pan; (2) record the mass (preferably 10-100 grams) of a quantity of brominated polymer particles, place the quantity on the top sieve (8 mesh) of the first stack, cover the top sieve, place the stack on a Retsch Model AS200 Sieve Shaker, turn the power of the Sieve Shaker to 60% for 20 minutes; (3) remove the stack of sieves from the sieve shaker and weigh each sieve. Subtract the tare weight to determine the mass of material retained on each sieve; (4) place any material that is in the bottom pan onto the top sieve (60 mesh) of the second stack and shake for 20 minutes as described in step (2); (5) determine the mass of material retained on each sieve as described in step (3); (6) determine the weight-mean particle size for the brominated polymer. The weight-mean particle size is the sieve mesh size above and below which 50 wt % of the brominated polymer is retained. When the weight-mean particle is between two sieve sizes used in the test method, determine the weight-mean particle size by linear extrapolation between the mesh sizes of those two sieve sizes.

The thermoset PU foam can contain other components including one or more than one selected from interfacial agents, phosphorus-containing compounds, chlorine containing compounds, additional brominated flame retardants, preservatives, antioxidants, catalyst, colorants, bitterants, fillers, infrared attenuators (such as carbon black, graphite and titanium dioxide) and residual blowing agent. For example, a particularly desirable embodiment of the foam of the present invention further comprises interfacial agents in the polyurethane matrix that is residual from the isocyanate-containing composition used to make the foam. As described below, such an interfacial agent is desirable for dispersing brominated polymer particles in an isocyanate-containing composition that is used to make the polymeric foam. Suitable types and concentrations of interfacial agents are described below.

In addition, or alternatively, to containing interfacial agents the thermoset PU foam can contain phosphorous-containing compounds, chlorine-containing compounds, or both phosphorous-containing compounds and chlorine-containing compounds to assist with imparting flame retardant properties to the thermoset PU foam.

The concentration of phosphorous in the thermoset PU foam is typically at least 0.15 wt %, preferably 0.25 wt % or more, and still more preferably at least 0.40 wt % and typically 0.75 wt % or less relative to total thermoset PU foam weight. Determine the concentration of phosphorous by using an Oxford Lab X1005 X-ray Fluorescence analyzer. A sample of brominated polymer or foam is submitted to x-ray radiation from a radioactive cadmium source. The x-ray radiation stimulates bromine, chlorine or phosphorous contained in the sample and results in x-ray emissions specific to each atomic species. Measuring the intensity of the x-rays emissions allows one to individually quantify each species contained in the sample.

The thermoset PU foam can contain chlorine or be free of chlorine. When chlorine is present, it can come from a number of possible sources. In some instances, the brominated polymer can contain chlorine. Additionally, or alternatively, chlorine-containing compounds other than the brominated polymer can be present in the thermoset PU foam. When chlorine is present, the amount of chlorine is typically 0.5 wt % or more and can be 1.0 wt % or more, 1.5 wt % or more and even 2.0 wt % or more while at the same time being 3 wt % or less relative to total thermoset PU foam weight. Determine the concentration of chlorine by x-ray fluorescence as already described.

Examples of phosphorous-containing compounds and chlorine-containing compounds that can be present in the thermoset PU foam of the present invention include any one or any combination of more than one of the following: phosphonate esters, phosphate esters, halogenated phosphate esters and chlorinated paraffins. Specific examples of desirable compounds include triethyl phosphate ("TEP") and tris(chloroisopropyl)phosphate ("TCPP").

The thermoset PU foam of the present invention generally has a density of 8 kilograms per cubic meter (kg/m$^3$) or higher, typically 24 kg/m$^3$ or higher and at the same time generally has a density of 160 kg/m$^3$ or lower, typically 96 kg/m$^3$ or lower, 70 kg/m$^3$ or lower, or even 49 kg/m$^3$ or lower.

Prepare the thermoset polyurethane foam of the present invention by mixing an isocyanate-containing composition with a polyol-containing composition in the presence of a brominated polymer and allowing the mixture to react and form a thermoset polyurethane foam.

The isocyanate-containing composition comprises an isocyanate-containing compound, an interfacial agent and a brominated polymer.

The isocyanate-containing compound contains at least two, and can contain at least three isocyanate functionalities per molecule. The isocyanate-containing compound can be any isocyanate-containing compound used to prepare thermoset polyurethane foam. Suitable isocyanate-containing compounds include: aliphatic polyisocyanates, cycloaliphatic isocyanates, aromatic polyisocyanates and any combinations thereof. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. The preferred polyisocyanates are aromatic polyisocyanates such as disclosed in U.S. Pat. No. 3,215,652. Especially preferred are methylene-bridged polyphenyl polyisocyanates and mixtures thereof with crude diphenylmethane diisocyanate, due to their ability to cross-link the polyurethane. Desirably, the isocyanate-containing compound includes or is polymeric methylene diphenyl diisocyanate (polymeric MDI).

The isocyanate-containing compounds desirably have an average functionality of 2 or more, preferably, 2.4 or more, still more preferably 2.7 or more. At the same time, it is desirably for the isocyanate-containing compound to have on average a functionality 3.5 or less and preferably 3.2 or less.

The brominated polymer is as described above. Typically, the brominated polymer is present in the isocyanate-containing composition, though it can be present in the isocyanate-containing composition, polyol-containing composition or both. When components reactive with the brominated copolymer (components such as amine catalysts) are present in the polyol-containing composition it is desirable to avoid dispersing the brominated copolymer into the polyol-containing composition. The brominated polymer is insoluble in the isocyanate-containing compound and, when present in the isocyanate-containing composition, exists as a solid within the isocyanate-containing composition. Desirably, the brominated polymer is in the form of solid particulates dispersed within the isocyanate-containing compound. Preferably, the solid particles of brominated polymer dispersed in the isocyanate-containing compound have a weight-mean particle size as described previously herein.

It is further conceivable that the brominated copolymer be added as a separate feed as the isocyanate-containing composition and polyol-containing compositions are mixed to react when forming the thermoset polymer foam. Adding the brominated copolymer as a separate feed can result in less homogeneous distribution of the brominated copolymer throughout the resulting foam that is desirable so it is not the most desirable method.

The amount of brominated polymer, regardless of how or where it is introduced, is sufficient to achieve the concentration of brominated copolymer in the resulting thermoset PU foam as stated above.

The interfacial agent is characterized as having either (a) a hydrophilic-lipophilic balance (HLB) in a range of 5 to 15 as determined by the method at taught in M. J. Rosen, Surfactants and Interfacial Phenomena, 2$^{nd}$ edition, pages 327-329, John Wiley and Sons, New York (1980); or (b) a cloud point temperature of up to 60 degrees Celsius in a 4 weight-percent aqueous solution as determined according to DIN EN 1890. HLB is used to characterize non-silicone based interfacial agents while the cloud point is used to characterize silicone-based interfacial agents. The interfacial agent also has a viscosity of at least 500 centiPoise, preferably 750 centiPoise or greater and more preferably 1000 centiPoise or greater, while at the same time desirably 5000 centiPoise or less. Measure interfacial agent viscosity at 25 degrees Celsius using a Brookfield viscometer with spindle 63 at 50 revolutions per minute. The interfacial agent stabilizes the brominated polymer within the isocyanate-containing compound so to form a dispersion of brominated polymer in the isocyanate-containing composition long enough to mix the isocyanate-containing composition with a polyol-containing composition to form a foam. Typically, and desirably, the brominated polymer is not soluble in the isocyanate-containing compound and remains as a solid in the isocyanate composition. The interfacial agent has a particularly high viscosity in order to sustain the solid brominated polymer particulates as a suspension in the isocyanate-containing compound.

Desirable interfacial agents include polyalkylene oxides and silicone based interfacial agents. One particularly desirable interfacial agent is a polyethylene oxide-co-butylene oxide triblock organic surfactant with equivalent weight of 3400 and nominal viscosity of 3300 centiPoise such as that sold under the tradename VORASURF™ 504 (VORASURF is a trademark of The Dow Chemical Company). Silicone-based interfacial agents are particularly desirable including polydimethyl siloxane and polyethylene oxide-co-propylene oxide random or block graft copolymers and blends thereof such as those sold under the tradenames TEGOSTAB™ B8535, TEGOSTAB™ B8488, and TEGOSTAB™ B8526 (TEGOSTAB is a trademark of Goldschmidt GmbH).

Desirably, the concentration of interfacial agent is at least ten weight-percent (wt %), preferably 15 wt % or more, still more preferably 20 wt % or more and at the same time desirably 50 wt % or less based on total combined weight of brominated polymer and interfacial agent. If the concentration is less than ten weight-percent then the brominated polymer particles are not readily dispersed in the isocyanate-containing composition. If the concentration exceeds 50 wt % then flocculation or coagulation of the dispersed particles of brominated polymer can occur.

The isocyanate-containing composition can further comprise one or more than one additive such as those selected from phosphorous-containing compounds (for example, TEP an TCPP), chlorine-containing compounds (for example TCPP), blowing agents (for example pentane isomers, HFC 245fa, and HFC 134a), additional surfactants, and additional flame retardants (for example n-propyl bromine and chlorinated paraffin). The additives are desirably non-reactive with the isocyanate-containing compounds in the isocyanate-containing composition.

In a particularly desirably embodiment, the isocyanate-containing composition comprises a phosphorous-containing compound and/or a chlorine-containing compound to assist in flame retardant properties. In an even more desirable embodiment, the isocyanate-containing composition further comprises a surfactant and the brominated polymer.

The polyol-containing composition comprises a polyol and a blowing agent. The polyol-containing composition can, and desirably does further contain water. The polyol-containing composition can comprise a surfactant, a catalyst or both. Moreover, the polyol-containing composition can further comprise any one or any combination of more than one auxiliary additives such as fillers, colorants, odor masking agents, additional flame retardants, biocides, antioxidants, ultraviolet (UV) stabilizer, antistatic agents, and viscosity modifiers.

Suitable polyols include polyether or polyester polyols as well as aromatic polyols. Polyols which may be present in the polyol composition include one or more other polyether or polyesters polyols of the kind typically employed in processes to make polyurethane foam. Other compounds having at least two isocyanate reactive hydrogen atoms may also be present, for example polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. Mixtures of two or more of the aforesaid materials may also be employed.

The term "polyester polyol" as used in this specification and claims includes any minor amounts of unreacted polyol remaining after the preparation of the polyester polyol and/or unesterified polyol (for example, glycol) added after the preparation of the polyester polyol. Suitable polyester polyols can be produced, for example, from aliphatic organic dicarboxylic acids with 2 to 12 carbons, preferably aliphatic dicarboxylic acids with 4 to 6 carbons, and multivalent alcohols, preferably diols, with 2 to 12 carbons. Examples of aliphatic dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The corresponding dicarboxylic acid derivatives may also be used such as dicarboxylic acid mono- or di-esters of alcohols with 1 to 4 carbons, or dicarboxylic acid anhydrides. Examples of divalent and multivalent alcohols, especially diols, include ethanediol, diethylene glycol, glycerine and trimethylolpropanes or mixtures of at least two of these diols.

Useful aromatic polyols include aromatic polyether polyol or an aromatic polyester polyol or combinations of the two. Particularly desirably aromatic polyester polyol is an aromatic dicarboxylic acid with 8 to 24 carbons. While the aromatic polyester polyols can be prepared from substantially pure aromatic dicarboxylic acids, more complex ingredients are advantageously used, such as the side stream, waste or scrap residues from the manufacture of phthalic acid, terephthalic acid, dimethyl terephthalate, and polyethylene terephthalate. Other residues are dimethyl terephthalate (DMT) process residues, which are waste or scrap residues the manufacture of DMT. The present applicants have observed that for certain applications it is particularly advantageous for reasons of foam performance and processing to have present in the polyol composition both the "Novolac" polyol and an additional aromatic polyol which can be an aromatic polyether or aromatic polyester polyol.

Polyether polyols that additionally may be present include those which can be obtained by suitable organic amine initiators, either aliphatic or aromatic amines, which may be condensed with alkylene oxides. Preferable amines include monoethanolamine, vicinal toluenediamines, ethylenediamines, and propylenediamine.

Water is desirably added to the polyol-containing composition as yet another reactive component with the isocyanate-containing component. Water is typically added into the polyol-containing composition at a concentration of 0.1 wt % or more, preferably 0.2 wt % or more still more preferably 0.5 wt % or more and at the same time typically 1 wt % or less, with wt % relative to total combined weight of polyol-containing composition and isocyanate-containing composition (not including blowing agent weight). Surprisingly, it has been discovered in developing the present invention that particularly low flame height values and short extinguishment time values (as determined according to ASTM D 3104-04a) are achieved in the thermoset PU foam of the present invention when water is present at a concentration of 0.8 to 0.5 wt % relative to total combined weight of polyol-containing composition and isocyanate-containing composition (not including blowing agent weight).

Suitable blowing agents include any one or combination of more than one of the following: hydrochlorofluorocarbons, hydrofluorocarbons and hydrocarbons. The blowing agent is preferably used in an amount of from 2 to 30 parts, preferably 2 to 15 parts, more preferably from 4 to 10 parts, per 100 parts by weight of the polyol-containing composition.

Suitable hydrofluorocarbons in include hydrofluoroalkanes, fluoroalkanes, hydrofluoroalkanes and fluoroalkenes. Suitable hydrofluoroalkanes are the C1-C4 compounds including difluoromethane (R-32), 1,1,1,2-tetrafluoroethane (R-134a), 1,1-di-fluoroethane (R-152a), difluorochloroethane (R-142b), trifluoromethane (R-23), heptafluoropropane (R-227a), hexafluoropropane (R136), 1,1,1-trifluoroethane (R-133), fluoroethane (R-161),1,1,1,2,2-pentafluoropropane (R-245fa), pentafluoropropylene (R2125a), 1,1,1,3-tetrafluoropropane, tetrafluoropropylene (R-2134a), 1,1,2,3,3-penta-fluoropropane and 1,1,1,3,3-pentafluoro-n-butane. When a hydrofluorocarbon blowing agent is present, preferred is tetrafluoroethane (R-134a), pentafluoropropane (R-245fa) or pentafluorobutane (R-365). Suitable hydrocarbons for use as blowing agent include nonhalogenated hydrocarbons such as butane, isobutane, 2,3-dimethylbutane, n- and iso-pentane isomers, cyclopentane, hexane isomers, heptanes isomers and cycloalkanes including cyclopentane, cyclohexane and cycloheptane and blends thereof. Preferred hydrocarbons for use as blowing agent include cyclopentane and notably n-pentane or iso-pentane and blends thereof. In a preferred embodiment of this invention the polyol composition comprises a physical blowing agent selected from the group consisting of tetrafluoroethane (R-134a), pentafluoropropane (R-245fa), pentafluorobutane (R-365), cyclopentane, n-pentane and iso-pentane.

A catalyst, or combination of catalysts, for the reaction of the polyol (and water, if present) with the polyisocyanate are advantageously present. Any suitable urethane catalyst is acceptable, including tertiary amine compounds and organometallic compounds. Exemplary tertiary amine compounds include triethylenediamine, N-methylmorpholine, N,N-dimethylcyclohexylamine, pentamethyldiethylenetriamine, tetramethylethylene-diamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-di-methyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408. A catalyst for the trimerization of polyisocyanates, resulting in a polyisocyanurate, such as an alkali metal alkoxide may also be employed herein alone or in combination with a urethane catalyst. Such catalysts are used in an amount which measurably increases the rate of polyurethane or polyisocyanurate formation. Typical catalysts include diethylene or dipropylene glycol mixtures with potassium salts of carboxylic acids containing from 3 to 12 carbons, especially from 3 to 8 carbons. The carboxylic acids may be linear or branched. Typical amounts are 0.001 to 15 parts of catalyst per 100 parts by weight, preferably, 4 to 12 parts of catalyst per 100 parts by weight of total polyol.

The catalyst (reaction catalyst) is typically present in the polyol-containing composition prior to mixing with the isocyanate-containing composition. However, the catalyst can also or alternatively be added as a separate component while mixing the polyol-containing composition and the isocyanate-containing composition.

The thermoset PU foam of the present invention has improved flame retardant properties relative to a similar thermoset PU foam that is free of flame retardant. Similarly, the thermoset PU foam of the present invention has improved flame retardant properties relative to a similar thermoset PU foam that contains brominated polystyrene flame retardant. Evaluate flame retardant properties according to ASTM method D3104-04a ("Butler Chimney" test).

EXAMPLES

TABLE 1

| Materials | | |
|---|---|---|
| Material | Supplier | Generic Description |
| ANTIBLAZE ™ 80 Fyrol PCF (TCPP) | Albemarle | Tri-(chloroisopropyl)phosphate or 2-Propanol, 1-chloro-, phosphate (TCPP) |
| Brominated polymer | Chemtura | Powder of an aliphatic brominated polymer of styrene-butadiene-styrene (SBS) triblock with 66% bromine with powder size between 27 microns and 2 mm. |
| DABCO ™ MB20 | Air Products | A bismuth based carboxylate having a flash point of 158° C., a viscosity at 25° C. of 50 mPa/s, a specific gravity at 25° C. of 1.22 grams per cubic centimeter, a calculated OH number of 177 milligrams potassium hydroxide per gram. |
| DABCO ™ DC193 | Air Products | Silicone surfactant - Polydimethylsiloxane (PDMS) backbone and polyethylene oxide-co-propylene oxide (PEO-PPO) random copolymer grafts. |
| IP585 | The Dow Chemical Company | Phenol polymer with formaldehyde, propylene oxide and ethylene oxide. |
| NIAX ™ A-1 | Momentive | 70 weight-percent bis(2-dimethylaminoethyl) ether in dipropylene glycol. |
| n-propyl bromide (n-PBr) | Albemarle | 1-bromonpropane. Brominated hydrocarbon at 28.5% bromine |
| PAPI ™ 20 | The Dow Chemical Company | polymethylene polyphenylisocyanate that contain MDI having an isocyanate functionality of 3.3 at isocyanate content of 35% |
| PAPI ™ 27 | The Dow Chemical Company | polymethylene polyphenylisocyanate that contain MDI having an isocyanate functionality of 2.7 at isocyanate content of 35% |
| PELCAT 9887E | Ele-Pelron | Blend of gelation and trimerization catalysts |
| PHT4-DIOL | Chemtura | Aryl-brominated reactive flame retardant, Tetrabromophthalate diol at 46% Br, viscosity 100,000 cPs, equivalent weight 314 |
| POLYCAT ™ 8 | Air Products | Polyaluminum chloride (alumina complexed polymer) having a boiling point of 101° C. and a specific gravity at 16° C. of 1.335 grams per cubic centimeter. |
| POLYCAT ™ 9 | Air Products | Tertiary amine having a flash point of 102° C., viscosity at 25° C. of 6 centiPoise, a specific gravity at 25° C. of 0.87 grams per cubic centimeter. |
| POLYCAT ™ 43 | Air Products | Proprietary blend of tertiary amines with equivalent weight of 103.5, balanced gelling and trimerization catalyst. |
| SAYTEX ™ HP-7010P | Albemarle | Aryl-brominated polystyrene as powder with 67.6 wt % Br, Mw of approximately 64,000 g/mol, weight-mean particle size of 150 micrometers and five percent weight loss temperature of 375° C. |
| SAYTEX ™ RB79 | Albemarle | Aryl-brominated reactive flame retardant, Tetrabromophthalate diol at 45% Br, viscosity 100,000 cPs, equivalent weight 314 |

TABLE 1-continued

Materials

| Material | Supplier | Generic Description |
|---|---|---|
| SH 80:20 | South Hampton | Hydrocarbon blowing agent containing a mixture of cyclo and iso pentane along with dimethylbutane (60/20/20 wt ratio) |
| TEGOSTAB ™ B8488 | Evonik | Silicone surfactant - Polydimethylsiloxane (PDMS) backbone and polyethylene oxide-co-propylene oxide (PEO-PPO) random copolymer grafts with viscosity of 1000 cPs, insoluble in water |
| TEGOSTAB ™ B8526 | Evonik | Silicone surfactant - Polydimethylsiloxane (PDMS) backbone and polyethylene oxide-co-propylene oxide (PEO-PPO) random copolymer grafts with viscosity of 3000 cPs, insoluble in water |
| TEGOSTAB ™ B8535 | Evonik | Silicone surfactant - Polydimethylsiloxane (PDMS) backbone and polyethylene oxide-co-propylene oxide (PEO-PPO) random copolymer grafts with viscosity of 1200 cPs, Cloud point of 59 C. |
| TERATE ™ 2031 | Invista | Terephthalate extended Aromatic polyester polyol with functionality of 2.3 with equivalent weight of 183 |
| TERATE ™ 3510 | Invista | Terephthalate extended Aromatic polyester polyol with functionality of 2.0, equivalent weight of 237 |
| TERATE ™ 3512A | Invista | Terephthalate extended Aromatic polyester polyol with 7.5% TCPP with functionality of 2.0 with equivalent weight of 247 |
| Triethyl phosphate | Aldrich | TEP or organic phosphate |
| VORANOL ™ 470X | The Dow Chemical Company | Amine-initiated polyol - Oxirane, 2-methyl-, polymer with oxirane, ether with 2,6,-bis[[bis(2-hydroxyethyl)amino]methyl]-4-nonylphenol with equivalent weight of 119. |
| VORASURF ™ 504 | The Dow Chemical Company | Polyethylene oxide-co-butylene oxide triblock organic surfactant with equivalent weight of 3400 and nominal viscosity of 3300 cPs at 25 C. |

TERATE is a trademark of Invista North America S.A.R.L. Corporation
ANTIBLAZE and SAYTEX are trademarks of Albemarle Corporation
PAPI, VORANOL and VORASURF are trademarks of The Dow Chemical Company
DABCO and POLYCAT are trademarks of Air Products and Chemicals, Inc.
TEGOSTAB is a trademark of Evonik Goldschmidt GmbH
NIAX is a trademark of General Electric Company Preparation of Brominated Polymer Prepare three different brominated polymers (PBrPBD1, PBrPBD2 and PBrPBD3) by brominating a poly(styrene-butadiene-styrene) triblock copolymer (rubber) according to the method set forth in Example 7 of WO2008/021417A2. Characteristics for the resulting brominated polymers are in Table 2.

Prepare PBrPBD1 using a rubber (Rubber 1) from Scientific Polymer Products, the rubber characterized by proton NMR and gel permeation chromatography (as described above) to have the following properties: weight average molecular weight (Mw) of 128,000 grams per mole, polydispersity of 1.13, styrene content of 31 wt % and a 1,2 vinyl content of 8 mole-percent based on total moles of butadiene present.

Prepare PBrPBD2 using a rubber (Rubber 2) prepared according to the process of European patent 1957544B1, example SBC-12 (1,2-vinyl content of 83 mole-percent) except the moles of n-butyl-lithium initiator and styrene were reduced to prepare a final rubber having a Mw of 91,000 grams per mole, polydispersity of 1.1, total styrene content of 33 wt % and a 1,2 vinyl content of 87 mole-percent as measured by proton NMR spectroscopy. Determine total weight-percent bromine by x-ray fluorescence as described above.

Prepare PBrPBD3 in like manner as PBrPBD2 except modify the moles of n-butyl-lithium initiator and styrene to prepare a final rubber having a Mw of 140,000 grams per mole, polydispersity of 1.1, total styrene content of 33 wt % and a 1,2 vinyl content of 85 mole-percent as measured by proton NMR spectroscopy. Determine total weight-percent bromine by x-ray fluorescence as described above.

TABLE 2

Brominated Polymer Characteristics

| Property | PBrPBD1 | PBrPBD2 | PBrPBD3 |
|---|---|---|---|
| Mw (g/mol) based on polystyrene standard | 165,000 | 93,000 | 145,000* |
| Total weight-percent bromine | 67 | 66 | 66 |
| Weight-mean particle size (micrometers) | 163 | 700-800 | 27 |
| Five percent weight-loss temperature (° C.) | 222 | 266.9 | 247 |

*Estimate

Preparation of Thermoset Polyurethane Foam

Prepare thermoset polyurethane foam by hand mixing components together in the following manner. The specific formulations for the various examples are in Tables 3, 5, 7 and 9.

Prepare a polyol-containing composition (B-side) by adding to a bottle the polyol, surfactant, water (if any) and blowing agent and any other components as indicated in Tables 3, 5, 7 and 9 for a specific foam. Set the bottle with the components on a shaker table and allow to shake until visibly homogeneous (5-10 minutes). For those foam samples containing HFC-245fa blowing agent the bottle of polyol blend with blowing agent was then set in an open water bath at 5° C. overnight prior to use.

Prepare an isocyanate-containing composition (A-side) in a mixing vessel by adding to the mixing vessel the isocyanate-containing compound, surfactant, brominated polymer and any other components designated in Tables 3, 5, 7 and 9 for a specific foam. Mix the components together in the mixing vessel with an impeller submerged in the components while gradually increasing the mixing rate up to 5000 revolutions per minute over a period approximately 30 seconds. For those foam samples containing HFC-245fa blowing agent the bottle of A-side blend was then set in an open water bath at 5° C. overnight prior to use.

Place the A-side and mixing vessel on a scale and add while mixing the proper amount of B-side for a formulation selected from Tables 3, 5, 7 and 9 and mix for 10 seconds.

Inject the catalyst (C-side) as specified in Tables 3, 5, 7 and 9 using a syringe into the mixing vessel while continuing to mix for 5-7 seconds. For those foam samples containing HFC-245fa blowing agent the bottle of catalyst blend was then set in an open water bath at 5° C. overnight prior to use.

Pour the contents of the mixing vessel into a foaming vessel (for example, a paper cup). Observe the color change for cream time and use a tongue depressor to measure firmness. "Firm" is established when the tongue depressor is inserted into a foam and experiences resistance as it is pulled out. Allow the resulting foam to set for one week. Cut the resulting foam using a band saw into specimens for further characterization.

Determine foam density according to ASTM method D1622-08. Characterize fire performance according to ASTM D3104-04a ("Butler Chimney" test) for flame height, extinguish time and mass retention.

Comparative Examples (Comp Exs) A and B and Examples (Exs) 1-3

Table 3 contains the formulations for Comp Exs A and B and Exs 1-3 (note: all values are in grams). Table 4 contains characterization of the resulting thermoset PU foams.

TABLE 4

Characterization of Comp Exs A and B and Exs 1-3

| | Comp Ex A | Comp Ex B | Ex 1 | Ex 2 | Ex 3 |
|---|---|---|---|---|---|
| Br (%) | 0.00 | 4.50 | 2.95 | 4.50 | 2.95 |
| Cl (%) | 0.00 | 0.00 | 0.00 | 0.00 | 0.00 |
| P (%) | 0.00 | 0.00 | 0.00 | 0.00 | 0.20 |
| % Trimer | 17.3 | 17.3 | 17.3 | 17.3 | 17.3 |
| Foam Density (kg/m$^3$) | 32.3 | 32.2 | 31.5 | 33.8 | 32.6 |
| extinguish time (seconds) | 30.2 | 4.5 | 2.9 | 1.5 | 1.4 |
| flame height (millimeters) (avgSTDEV = 24) | >450 | >450 | >450 | 360 | 258.3 |
| mass retention (%) (avgSTDEV = 2.7) | 37.58 | 66.78 | 72.76 | 78.17 | 85.65 |

A comparison of the characterization of Comp Exs A and B illustrate that brominated polystyrene is ineffective as a flame retardant in thermoset PU foam.

A comparison of Exs 1 and 2 to Comp Exs A and B illustrate that the brominated polymer used to form thermoset PU foam of the present invention is effective as a flame retardant as evident by the Exs having a lower extinguish time, greater mass retention and generally lower flame height than a thermoset PU foam without flame retardant (Comp Ex A) and a thermoset PU foam with brominated polystyrene (Comp Ex B).

Examples (Exs) 4-9

Table 5 contains the formulations for Exs 4-9 (note: all values are in grams). Table 6 contains characterizations of the resulting thermoset PU foams.

TABLE 3

Formulations for Comp Exs A and B and Exs 1-3

| | Comp Ex A | Comp Ex B | Ex 1 | Ex 2 | Ex 3 |
|---|---|---|---|---|---|
| Component A - Isocyanate Composition | | | | | |
| Isocyanate (PAPI 27) (g) | 367.9 | 383.80 | 381.20 | 385.50 | 380.00 |
| VORASURF 504 (g) | 0 | 11.78 | 8.21 | 13.07 | 8.30 |
| Brominated Polymer Type | none | Saytex HP-7010P | PBrPBD2 | PBrPBD2 | PBrPBD2 |
| Brominated Polymer amount (g) | 0 | 38.3 | 26.70 | 42.50 | 27.00 |
| TEP (g) | 0 | 0.00 | 0.00 | 0.00 | 6.70 |
| Total Component A (g) | 367.9 | 433.88 | 416.11 | 441.07 | 422.00 |
| Component B - Polyol Composition | | | | | |
| VORASURF 504 (g) | 4.00 | 4.00 | 4.00 | 4.00 | 4.00 |
| TERATE 3510 (g) | 100 | 100.00 | 100.00 | 100.00 | 100.00 |
| SH 80:20 (g) | 28.08 | 31.58 | 31.58 | 31.58 | 31.58 |
| Water (g) | 2.00 | 2.00 | 2.00 | 2.00 | 2.00 |
| Total Component B (g) | 134.08 | 137.58 | 137.58 | 137.58 | 137.58 |
| Component C - Catalyst | | | | | |
| PelCat 9887E (g) | 11.5 | 11.5 | 11.5 | 11.5 | 11.5 |

TABLE 5

Formulations for Exs 4-9

|  | Ex 4 | Ex5 | Ex 6 | Ex 7 | Ex 8 | Ex 9 |
|---|---|---|---|---|---|---|
| Component A - Isocyanate-Containing Composition | | | | | | |
| Isocyanate PAPI 27 (g) | 380.00 | 380.00 | 405.00 | 406.30 | 244.10 | 377.10 |
| VORASURF 504 (g) | 8.33 | 8.43 | 33.61 | 6.20 | 3.17 | 8.36 |
| Brominated Polymer (PBrPBD2) (g) | 27.10 | 27.40 | 109.30 | 20.16 | 10.30 | 27.18 |
| TCPP (g) | 0.00 | 0.00 | 0.00 | 22.40 | 12.50 | 20.30 |
| TEP (g) | 10.00 | 15.70 | 89.70 | 0.00 | 0.00 | 0.00 |
| Total Component A (g) | 425.43 | 431.53 | 637.61 | 455.06 | 270.07 | 432.94 |
| Component B - Polyol-containing Composition | | | | | | |
| TERATE 3512A (g) | 0.00 | 0.00 | 0.00 | 100.00 | 100.00 | 100.00 |
| Vorasurf 504 (g) | 4.00 | 4.00 | 4.00 | 4.00 | 4.00 | 4.00 |
| SAYTEX RB79 (g) | 0.00 | 0.00 | 0.00 | 12.80 | 12.8 | 0.00 |
| TERATE 3510 (g) | 100.00 | 100.00 | 100.00 | 0.00 | 0.00 | 0.00 |
| SH 80:20 (g) | 31.58 | 31.58 | 54.98 | 38.00 | 19.24 | 26.00 |
| Water (g) | 2.00 | 2.00 | 2.00 | 2.00 | 2.00 | 2.00 |
| Total Component B (g) | 137.58 | 137.58 | 160.98 | 156.80 | 138.04 | 132.00 |
| Component C - Catalyst | | | | | | |
| PELCAT 9887E (g) | 11.5 | 11.5 | 9.00 | 13.00 | 8.70 | 11.50 |

TABLE 6

Characterizations for Exs 4-9

|  | Ex 4 | Ex 5 | Ex 6 | Ex 7 | Ex 8 | Ex 9 |
|---|---|---|---|---|---|---|
| Br (wt %) | 2.95 | 2.95 | 8.40 | 2.94 | 2.93 | 2.95 |
| Cl (wt %) | 0.00 | 0.00 | 0.00 | 1.56 | 1.56 | 1.57 |
| P (wt %) | 0.30 | 0.46 | 1.89 | 0.45 | 0.46 | 0.46 |
| % Trimer | 17.3 | 17.3 | 17.3 | 17.3 | 11.9 | 17.5 |
| Foam Density (kg/m$^3$) | 1.97 (31.5) | 1.99 (31.8) | 2.4 (38.4) | 1.83 (29.3) | 2.1 (33.6) | 2.1 (33.6) |
| Extinguish time (s) | 1.4 | 0.2 | 0 | 2.2 | 2.3 | 2.3 |
| Flame height (millimeters) (avgSTDEV = 24) | 260 | 208.3 | 202 | 328.3 | 345 | 345 |
| Mass retention (%) (avgSTDEV = 2.7) | 85.39 | 87.54 | 86.86 | 78.04 | 70.9 | 70.9 |

Examples 3-6 illustrate that the presence of phosphorous improves flame retardant properties for thermoset PU foams of the present invention even over thermoset PU foams with just the brominated polymer (Exs 1 and 2) as is evidenced by a lower flame height and higher mass retention when phosphorous is present.

Examples 7-9 illustrate chlorine can be present in the thermoset PU foams of the present invention, but that chlorine does not necessarily improve flame retardant properties over the brominated polymer alone (compare to Ex 1) and appears to inhibit flame retardant properties relative to a mere combination of brominated polymer and phosphorous (compare to Exs 4 and 5).

Examples 7 and 8 illustrate that brominated flame retardants in addition to the brominated polymer can be present in thermoset PU foams of the present invention and still achieve desirable flame retardant properties.

Examples (Exs) 10-15

Table 7 contains the formulations for Exs 10-15 (note: all values are in grams). Table 8 contains characterizations of the resulting thermoset PU foams.

TABLE 7

Formulations for Exs 10-15

|  | Ex 10 | Ex 11 | Ex 12 | Ex 13 | Ex 14 | Ex 15 |
|---|---|---|---|---|---|---|
| Component A - Isocyanate Composition | | | | | | |
| Isocyanate PAPI 27 (g) | 391 | 396 | 390 | 390 | 390 | 390 |
| Vorasurf 504 (g) | 8.4 | 13.3 | 8.58 | 8.29 | 8.15 | 7.0 |
| Brominated Polymer Type | PBrPBD1 | PBrPBD1 | PBrPBD1 | PBrPBD1 | PBrPBD1 | PBrPBD3 |

TABLE 7-continued

Formulations for Exs 10-15

|  | Ex 10 | Ex 11 | Ex 12 | Ex 13 | Ex 14 | Ex 15 |
|---|---|---|---|---|---|---|
| Brominated Polymer amount (g) | 27.2 | 43.3 | 27.9 | 26.95 | 26.5 | 22.8 |
| TEP (g) | 0.00 | 0.00 | 6.8 | 6.8 | 6.7 | 0.00 |
| Total Component A (g) | 426.6 | 452.6 | 433.3 | 432 | 431.22 | 419.8 |
| Component B - Polyol Composition | | | | | | |
| Vorasurf 504 (g) | 4.00 | 4.00 | 4.00 | 4.00 | 4.00 | 4.00 |
| TERATE 3510 (g) | 100.00 | 100.00 | 100.00 | 100.00 | 100.00 | 100.00 |
| Blowing Agent (SH 80:20) (g) | 31.58 | 31.58 | 50.00 | 13.0 | 0.00 | 31.58 |
| Water (g) | 2.00 | 2.00 | 2.00 | 2.00 | 2.00 | 2.00 |
| Total Component B (g) | 137.58 | 137.58 | 156 | 119 | 106 | 137.58 |
| Component C - Catalyst | | | | | | |
| Catalyst - (g) and type | 11.5 PelCat 9887E | 11.5 PelCat 9887E | 11.5 PelCat 9887E | 11.5 PelCat 9887E | 8.0 PelCat 9887E | 11.5 PelCat 9887E |

TABLE 8

Characterizations for Exs 10-15

|  | Ex 10 | Ex 11 | Ex 12 | Ex 13 | Ex 14 | Ex 15 |
|---|---|---|---|---|---|---|
| Br (%) | 2.95 | 4.50 | 2.95 | 2.95 | 2.95 | 2.5 |
| Cl (%) | 0.0 | 0.00 | 0.00 | 0.00 | 0.00 | 0.00 |
| P (%) | 0.0 | 0.00 | 0.46 | 0.46 | 0.46 | 0 |
| % Trimer | 17.5 | 17.5 | 17.3 | 17.3 | 17.3 | 17.5 |
| Foam Density (kg/m$^3$) | 32.2 | 33.5 | 25.5 | 49.5 | 87 | 30.6 |
| Extinguish time (s) | 0 | 0.7 | 0 | 0 | 0 | 0.7 |
| Flame height (millimeters) (avgSTDEV = 24) | >450 | >370 | 375 | 120 | 76.7 | >450 |
| Mass retention (%) (avgSTDEV = 2.7) | 79.79 | 82.77 | 78.78 | 95.41 | 98.24 | 79.5 |

Exs 10-14 illustrate thermoset PU foam containing a brominated polymer having a lower thermal stability (lower five percent weight loss temperature) than that in the other Exs still results in similar flame retardant performance (compare to Ex 2).

Exs 12-14 illustrate that flame retardant properties for the thermoset PU foams of the present invention are evident over a foam density range from 24 to 87 kg/m$^3$.

Exs 10-15, in combination with Exs 1-9, illustrate that brominated rubber particle size can range from 27 micrometers to 700-800 micrometers and still yield desirable fire performance.

Examples (Exs) 16-18

Table 9 contains the formulations for Exs 18-20 (note: all values are in grams). Table 10 contains characterizations for the resulting thermoset PU foams.

Exs 16-18 illustrate that flame retardant properties of the thermoset PU foam of the present invention is desirable with a trimer level as low as 3.4 wt %.

Examples 16-18 also illustrate the effect of phosphorous on the desirable flame retardant properties. As the weight percent of phosphorous decrease from 0.8 wt % (Ex 16) to 0.2 wt % (Ex 18) the flame height increases and the mass retention decreases.

Exs 16-18 also illustrate desirable flame retardant properties with thermoset PU foams of the present invention that contain a reactive novalac species (IP585).

TABLE 9

Formulations for Exs 16-18

|  | Ex 16 | Ex 17 | Ex 18 |
|---|---|---|---|
| Component A - Isocyanate Composition | | | |
| Isocyanate - PAPI 27 (g) | 108.4 | 110.3 | 112.2 |
| Brominated Polymer (PBrPDB1) (g) | 5.2 | 5.3 | 5.4 |
| Total (g) | 113.6 | 115.6 | 117.6 |
| Component B - Polyol Composition | | | |
| TERATE 2031 (g) | 43.1 | 43.1 | 48.07 |
| DABCO DC193 (g) | 0.71 | 0.71 | 0.71 |
| PHT4-DIOL (g) | 6.13 | 6.13 | 0.00 |
| IP585 (g) | 12.92 | 12.92 | 12.92 |
| TEP | 9.43 | 5.90 | 2.36 |
| Diethylene glycol (g) | 5.35 | 5.35 | 5.35 |
| alpha-methyl styrene (g) | 0.09 | 0.09 | 0.09 |
| Water (g) | 1.45 | 1.45 | 1.45 |
| HFC-245fa (g) | 11.25 | 11.25 | 11.25 |
| Total Component B (g) | 90.43 | 86.9 | 82.2 |
| Component C -- Catalyst | | | |
| PELCAT 9887E (g) | 10.1 | 10.3 | 10.5 |

TABLE 10

Characterization for Examples 16-18

|  | Ex 16 | Ex 17 | Ex 18 |
|---|---|---|---|
| Br (%) | 1.5 | 1.5 | 1.5 |
| Cl (%) | 0 | 0 | 0 |
| P (%) | 0.8 | 0.5 | 0.2 |
| % Trimer | 3.4 | 3.4 | 3.4 |
| Foam Density (kg/m$^3$) | 30.4 | 29.8 | 29.6 |
| Extinguish time (s) | 0.0 | 0.1 | 0.1 |
| Flame height (millimeters) (avgSTDEV = 24) | 328 | >400 | >400 |
| Mass retention (%) (avgSTDEV = 2.7) | 72.8 | 60.8 | 45.1 |

The invention claimed is:

1. A thermoset polyurethane foam comprising a brominated polymer, wherein the brominated polymer has copolymerized therein a butadiene moiety and a vinyl aromatic monomer moiety, the copolymer having, prior to bromination, a vinyl aromatic monomer content of from 5 to 90 percent by weight based upon copolymer weight, a 1,2-butadiene isomer content of greater than zero percent by weight based upon butadiene moiety weight, and a weight average molecular weight of at least 1000, the brominated copolymer having an unbrominated, non-aromatic double bond content of less than or equal to 50 percent based on non-aromatic double bond content of the polymer prior to bromination as determined by proton nuclear magnetic resonance spectroscopy and a five percent weight loss temperature, as determined by dynamic thermogravimetric analysis of at least 170 degrees Celsius, wherein the thermoset polyurethane foam exhibits an extinguish time less than or equal to 2.9 seconds in accordance with ASTM D3104-04a.

2. The thermoset polyurethane foam of claim 1, further characterized by the brominated polymer comprising at least 10 percent by weight bromine relative to total brominated polymer weight.

3. The thermoset polyurethane foam of claim 1, further characterized by the brominated polymer being in a form of solid particulates, the solid particulates having a number average median particle size of greater than one micron and smaller than 800 micrometers.

4. The thermoset polyurethane foam of claim 1, further comprising an interfacial active agent: (a) having a hydrophilic-lipophilic balance in a range of 5 to 15 as determined by the Rosen method or a cloud point of up to 60 degrees Celsius in a 4 weight-percent aqueous solution as determined by DIN EN 1890; (b) having a viscosity of at least 500 centiPoise at 25 degrees Celsius as determined using a Brookfield viscometer and spindle 63 at 50 revolutions per minute; and (c) being present at a concentration of at least ten weight-percent relative to the total combined weight of brominated polymer and interfacial agent.

5. The thermoset polyurethane foam of claim 1, further comprising a phosphorous-containing component and further characterized by the concentration of bromine being at least 0.5 weight-percent based on total foam weight and the concentration of phosphorous being at least 0.15 weight-percent based on total foam weight.

6. The thermoset polyurethane foam of claim 1, further comprising a chlorine-containing component.

7. The thermoset polyurethane foam of claim 1, further characterized by being free of brominated materials other than the brominated polymer.

8. The thermoset polyurethane foam of claim 1, further characterized by having a density of 24 kilograms per cubic meter or more and 100 kilograms per cubic meter or less and having a percent-trimer of 3 percent or more and 20 percent or less.

9. A method for preparing the polymeric foam of claim 1 by:
(a) providing an isocyanate-containing composition comprising an isocyanate-containing compound, an interfacial agent and a brominated polymer wherein:
(A) the isocyanate-containing compound contains at least two isocyanate functionalities per molecule;
(B) the interfacial agent: (i) has a hydrophilic-lipophilic balance in a range of 5 to 15 as determined by the Rosen method or a cloud point temperature of up to 60 degrees Celsius in a 4 weight-percent aqueous solution as determined by DIN EN 1890; (ii) has a viscosity of at least 500 centiPoise at 25 degrees Celsius as determined using a Brookfield viscometer and spindle 63 at 50 revolutions per minute; and (iii) is present at a concentration of at least ten weight-percent and 50 weight-percent or less relative to the total combined weight of brominated polymer and interfacial agent; and
(C) the brominated polymer is dispersed as solid particles in the isocyanate-containing compound and the brominated polymer has copolymerized therein a butadiene moiety and a vinyl aromatic monomer moiety, the copolymer having, prior to bromination, a vinyl aromatic monomer content of from 5 to 90 percent by weight based upon copolymer weight, a 1,2-butadiene isomer content of greater than zero percent by weight based upon butadiene moiety weight, and a weight average molecular weight of at least 1000, the brominated copolymer having an unbrominated, non-aromatic double bond content of less than or equal to 50 percent based upon non-aromatic double bond content of the copolymer prior to bromination as determined by proton nuclear magnetic resonance spectroscopy and a five percent weight loss temperature, as determined by dynamic thermogravimetric analysis of at least 170 degrees Celsius;
(b) providing a polyol-containing composition containing a polyol and a blowing agent; and
(c) mixing the isocyanate-containing composition with the polyol-containing composition and allowing to react and form the foam of claim 1;
wherein at least one of the isocyanate-containing compound and polyol have an average of more than two isocyanate-reactive sites per molecule and wherein the method further comprises either including a reaction catalyst in the polyol-containing composition or mixing a reaction catalyst together with the isocyanate-containing composition and polyol-containing composition during step (c), wherein the thermoset polyurethane foam exhibits an extinguish time less than or equal to 2.9 seconds in accordance with ASTM D3104-04a.

10. The method of claim 9, further characterized by water being present in the polyol-containing composition at a concentration in a range of greater than zero to 3 weight-percent based on total weight of polyol.

11. The method of claim 9, further characterized by the polyol-containing composition being free of brominated flame retardant.

12. The method of claim 9, further characterized by the isocyanate-containing composition further comprising a phosphorous-containing compound.

13. The method of claim 9, further characterized by the isocyanate-containing composition and polyol-containing composition both being free of brominated materials other than the brominated polymer.

* * * * *